(12) United States Patent
Khan et al.

(10) Patent No.: US 10,120,608 B2
(45) Date of Patent: *Nov. 6, 2018

(54) SYSTEM AND METHOD FOR COMPUTING MESSAGE DIGESTS

(71) Applicant: Intel Corporation, Santa Clara, CA (US)

(72) Inventors: Jawad B. Khan, Cornelius, OR (US); Knut S. Grimsrud, Forest Grove, OR (US); Richard L. Coulson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/462,278

(22) Filed: Mar. 17, 2017

(65) Prior Publication Data

US 2017/0322746 A1    Nov. 9, 2017

Related U.S. Application Data

(63) Continuation of application No. 14/091,598, filed on Nov. 27, 2013, now Pat. No. 9,619,167.

(51) Int. Cl.
*G06F 3/06* (2006.01)
*G06F 17/30* (2006.01)

(52) U.S. Cl.
CPC ............ *G06F 3/0641* (2013.01); *G06F 3/061* (2013.01); *G06F 3/0626* (2013.01); *G06F 3/0658* (2013.01); *G06F 3/0659* (2013.01); *G06F 3/0688* (2013.01); *G06F 17/30109* (2013.01); *G06F 2003/0697* (2013.01); *G06F 2212/402* (2013.01)

(58) Field of Classification Search
None
See application file for complete search history.

(56) References Cited

U.S. PATENT DOCUMENTS

| 7,941,459 B1 | 5/2011 | Erickson |
| 8,504,830 B2 | 8/2013 | Ishii et al. |
| 2007/0288760 A1 | 12/2007 | Euchner et al. |
| 2008/0104162 A1 | 5/2008 | Suzuki |

(Continued)

FOREIGN PATENT DOCUMENTS

| CN | 102598020 A | 7/2012 |
| WO | 2006061843 A2 | 6/2006 |
| WO | 2013074106 A1 | 5/2013 |

OTHER PUBLICATIONS

International Search Report for PCT/US2014/061533, dated Mar. 12, 2015, 4 pages.

(Continued)

*Primary Examiner* — Kaushikkumar M Patel
(74) *Attorney, Agent, or Firm* — Compass IP Law PC

(57) ABSTRACT

A data de-duplication approach leverages acceleration hardware in SSDs for performing digest computations used in de-duplication operations and support on behalf of an attached host, thereby relieving the host from the computing burden of the digest computation in de-duplication (de-dupe) processing. De-dupe processing typically involve computation and comparison of message digests (MD) and/or hash functions. Such MD functions are often also employed for cryptographic operations such as encryption and authentication. Often, SSDs include onboard hardware accelerators for MD functions associated with security features of the SSDs. However, the hardware accelerators may also be invoked for computing a message digest result and returning the result to the host, effectively offloading the burden of MD computation from the host, similar to an external hardware accelerator, but without redirecting the data since the digest computation is performed on a data stream passing through the SSD for storage.

18 Claims, 5 Drawing Sheets

(56) References Cited

U.S. PATENT DOCUMENTS

| | | |
|---|---|---|
| 2010/0306176 A1 | 12/2010 | Johnson et al. |
| 2011/0055471 A1 | 3/2011 | Thatcher |
| 2011/0246741 A1 | 10/2011 | Raymond |
| 2012/0197901 A1 | 8/2012 | Wilson |
| 2012/0260021 A1 | 10/2012 | Rudelic |
| 2013/0080403 A1 | 3/2013 | Yamakawa |
| 2013/0218851 A1 | 8/2013 | Yamakawa |
| 2013/0238876 A1 | 9/2013 | Fiske |
| 2014/0040698 A1 | 2/2014 | Loh |
| 2015/0032938 A1 | 1/2015 | Salessi |

OTHER PUBLICATIONS

Chinese and English Translation of P.R. China State Intellectual Property Office, Office Action for Patent Application No. 2014800590007, dated Nov. 3, 2017, 27 pages.

Extended European Search Report for Patent Application No. 14866765.2, dated Jul. 18, 2017, 5 pages.

Translation of Office Action and Search Report of The Russian Federation for Patent Application No. 2016116679, dated Aug. 21, 2017, 13 pages.

Advisory Action for U.S. Appl. No. 14/091,598, dated May 13, 2016, 3 pages.

Final Office Action for U.S. Appl. No. 14/091,598, dated Feb. 1, 2016, 14 pages.

International Preliminary Report on Patentability, PCT/US2014/061533, dated Jun. 9, 2016, 14 pages.

Notice of Allowance for U.S. Appl. No. 14/091,598, dated Dec. 1, 2016, 5 pages.

Office Action for U.S. Appl. No. 14/091,598, dated Jul. 28, 2016, 22 pages.

Office Action for U.S. Appl. No. 14/091,598, dated Sep. 10, 2015, 13 pages.

Chinese and English Translation of P.R. China State Intellectual Property Office, Second Office Action for Patent Application No. 201480059000.7, dated Jul. 4, 2018, 11 pages.

SYSTEM AND METHOD FOR COMPUTING MESSAGE DIGESTS

RELATED APPLICATIONS

This application is a continuation under 35 U.S.C. § 120 of U.S. patent application Ser. No. 14/091,598, filed Nov. 27, 2013, entitled "SYSTEM AND METHOD FOR COMPUTING MESSAGE DIGESTS," incorporated herein by reference in entirety.

BACKGROUND

A solid state disk (SSD) is a high performance storage device that contains no moving parts. SSDs are much faster than typical hard disk drives (HDD) with conventional rotating magnetic media, and typically include a controller to manage data storage. The controller manages operations of the SSD, including data storage and access as well as communication between the SSD and a host device. Data de-duplication is the mechanism whereby duplicates of any given set of data are identified and cross-referenced, and only unique data patterns are written to the storage medium and all the duplicates are captured as pointers to the unique data sets, typically blocks. If there is duplication in the data stream, this technique allows the system to drastically reduce the amount of data written to the drive.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
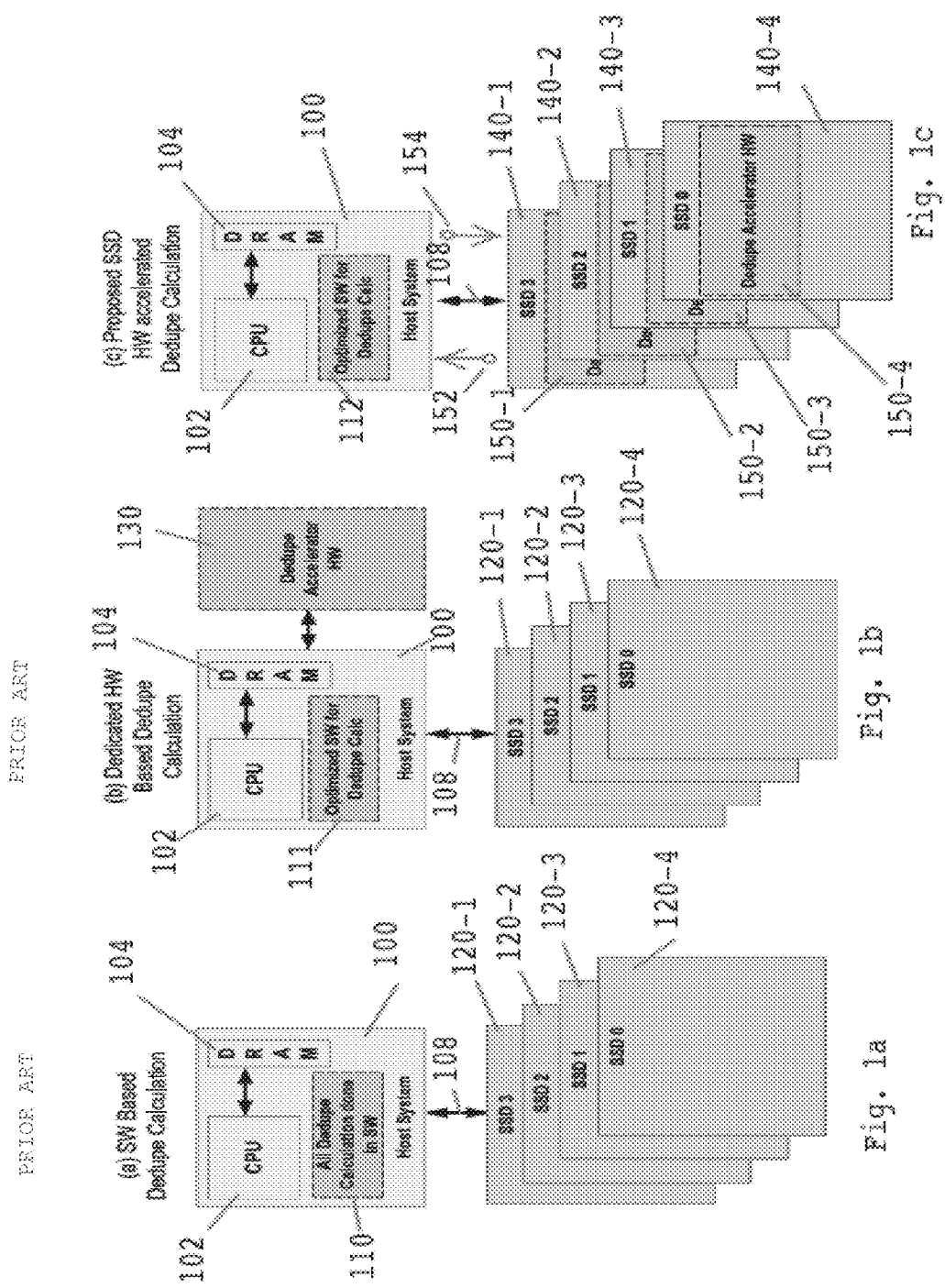
FIGS. 1a-1c show a context of implementation options for message digest computation.

A data de-duplication approach leverages acceleration hardware in mass storage devices such as HDDs and SSDs for performing de-duplication operations and support on behalf of an attached host, thereby relieving the host from the computing burden of the hash digest computations for the de-duplication (de-dupe) processing. De-dupe processing typically involve computation and comparison of message digests (MDs) and/or hash functions. MD functions are applied to an original data item to generate a smaller but unique identifier such that any change to the data will change the digest value, and are often also employed for cryptographic operations such as encryption and authentication. Often, SSDs include onboard hardware accelerators for MD functions associated with security features of the SSDs. However, the hardware accelerators may also be invoked for computing a digest (MD) result and returning the result to the host, effectively offloading the burden of MD computation from the host, similar to an external hardware accelerator, but without redirecting the data since the digest computation is performed on a data stream passing through the SSD for storage.

Configurations herein are based, in part, on the observation that message digest and hash operations tend to be computationally intensive, and can require substantial CPU cycles for large amounts of data. Unfortunately, conventional approaches to de-dupe operations suffer from the shortcoming that they require additional overhead for MD computations on the host, or require invocation of expensive hardware engines that redirect the data, further hindering performance and increasing cost. However, the on-board hardware accelerators disposed in modern SSDs may not be completely utilized by native security operations of the SSD, and the capability of the SSD hardware accelerators may be invoked by the host for MD computation. Accordingly, configurations disclosed herein substantially overcome the above described shortcomings by invoking the hardware accelerators on-board the SSD for receiving message digest requests from the host and returning the hash/digest results to the host.

The disclosed approach proposes a method for accelerating data de-duplication (a form of data compression) by accelerating the compute intensive operation of hash digest computation, on the SSD itself. The SSD architecture and design offers a unique opportunity for accelerating the digest computation in hardware due to the flow-through, state-less nature of hash digest computations. In the proposed approach, as the data flows through the SSD, the SSD computes the digests and sends them back to the host for the de-dupe digest matching, providing cost efficient, high performance and power efficient de-dupe support. As a part of the full disk encryption system, the SSD already has native HW engines available, for example Advanced Encryption Standard (AES) encryption/decryption and SHA-256 digest computation. The SSD already performs data transformations such as AES encryption/decryption as data flows through it. Adding flow through computation of the SHA digests, therefore, incurs only a modest incremental cost because in most design the HW acceleration engines for digest computation are already available in the SSD controller. Two different data path implementation configurations for computing digests are disclosed, including in-line and offline digest computation methods. These can be used individually or in conjunction with each other.

Configurations disclosed herein compute the digests in the SSD. This approach mitigates latencies since the data is fed in parallel to a dedicated HW acceleration engine. This approach is also power efficient since the data is not sent to system Dynamic random-access memory (DRAM) or to a dedicated acceleration HW engine which are both prone to use more power to complete the same operation. The approach offloads host Central Processing Unit (CPU) computation of digests and allows digest computation to be distributed across a number of drives in the storage subsystem.

The process of data deduplication involves identifying blocks of data which have identical content. Traditionally message digests are computed using the secure hash algorithms (SHA-256) or other digest computation algorithms. Usually 256 bits or 32 bytes in size or smaller digests are computed for each data block which can vary in length from 512 B to 4096 B or more. By comparing the digests, one can easily determine whether a block is identical to another block or not.

In conventional approaches, as discussed above, the data de-duplication systems may be entirely SW based, where the digest computation and comparison with previous digests is done in SW, which tends to burden the host CPU. There are also HW accelerators which can be attached to the storage systems in a data center which perform the digest computation and some portion of the digest comparison in HW, however this approach typically adds substantial expense.

An example architecture of a system using the proposed approach of digest computation on the SSD itself is shown below in FIG. 1c. The digest computation is a stateless, flow-through computation which is particularly well suited to be leveraged on an SSD controller. The SSD controller snoops the data as it is being written and computes the digests in HW for each block passing through it. The computed digests are returned to the host, when the command completes. This architecture is shown in more detail in FIG. 3. Further, there is minimal additional cost for enhancing an SSD controller to enable flow-through digest computation for supporting the disclosed approach.

FIGS. 1a-1c show a context of implementation options for message digest computation. Referring to FIGS. 1a-1c, FIG. 1a shows a conventional approach to duplication detection (de-dupe) using message digests. In FIG. 1a, a host system 100 has a CPU 102 and memory (DRAM) 104 for application execution, and invokes one or more SSDs 120-1 . . . 120-4 (120 generally) for mass storage. The host system 100 employs a de-dupe application or utility 110 for performing de-dupe calculations in software on the host 100, and requests 108 for storage are examined and compared to identify duplication (typically duplicate sectors, pages or blocks). In FIG. 1a, de-dupe detection detracts from overall CPU 102 performance due to the resources required for digest computation and comparison. A software based implementation also generally takes longer to perform than a hardware or firmware based approach.

FIG. 1b shows a host 100 with a dedicated de-dupe hardware peripheral or card 130 invokable from optimized code 111 for redirecting the I/O requests 108 to the dedicated de-dupe hardware 130. The dedicated hardware approach is effective, but requires the expense of an additional hardware element and also requires redirection of the I/O requests 108 for hardware 130 processing.

FIG. 1c shows native de-dupe accelerator hardware 150-1 . . . 150-4 in the SSD. Referring to FIG. 1c, in contrast to conventional approaches, configurations disclosed herein employ acceleration hardware disposed on an SSD already employed by the host 100 for I/O requests 108. SSDs often employ specialized hardware for security and/or encryption operations for data stored thereon. Rather then occupy host CPU cycles, or redirecting to expensive de-dupe hardware 130, on-board de-dupe accelerator hardware 150-1 . . . 150-4 on the SSD 140-1 . . . 140-4 is invoked. Host de-dupe instructions 112 invoke the accelerator hardware 150 for generating digests, and receive de-dupe digest results 152 in response to requests 154. Further, the accelerator hardware 150 operates on the data stream 108 already passing through the SSD for satisfying host I/O requests, therefore additional fetches and writes for de-dupe operations are avoided. In this manner, de-dupe accelerator hardware 150 is invoked by the host 100 for de-dupe operations that would otherwise burden the host 100 with computation (FIG. 1a) or redirection (FIG. 1b) of the data for de-dupe operations.

Figure 2:
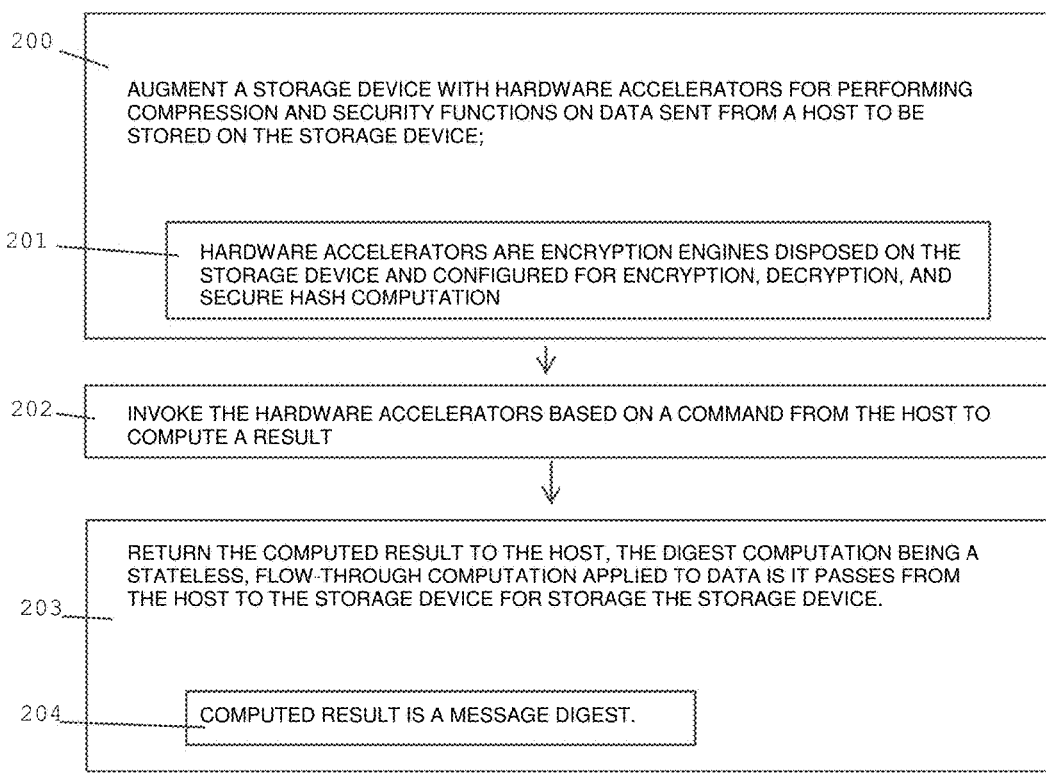
FIG. 2 shows a flowchart of message digest computation as disclosed herein.

FIG. 2 shows a flowchart of message digest computation as disclosed herein. Referring to FIGS. 1c and 2, at step 200, the method of storing data as disclosed herein includes augmenting a storage device, such as the SSD 140, with hardware accelerators 150 for performing compression and security functions on data sent from the host 100 to be stored on the storage device. In the example configuration, the hardware accelerators 150 are encryption engines disposed on the storage device and configured for encryption, decryption, and secure hash computation, as depicted at step 201. Since the hardware accelerators 150 are already designed into the SSDs 140 to support security based encryption and authentication, no additional manufacturing costs need be incurred for de-dupe usage.

The host 100 invokes the hardware accelerators 150 based on a command or request 154 from the host 100 to compute a result 152, as shown at step 202. The SSD 140 returns the computed digest result 152 to the host 100, in which the digest computation is a stateless, flow-through computation applied to data is it passes from the host 100 to the storage device for storage on the storage device, as depicted at step 203. In the example arrangement, the computed result 152 is a message digest, as disclosed at step 204, for comparison with digests of other stored blocks for supporting de-dupe operations.

Figure 3:
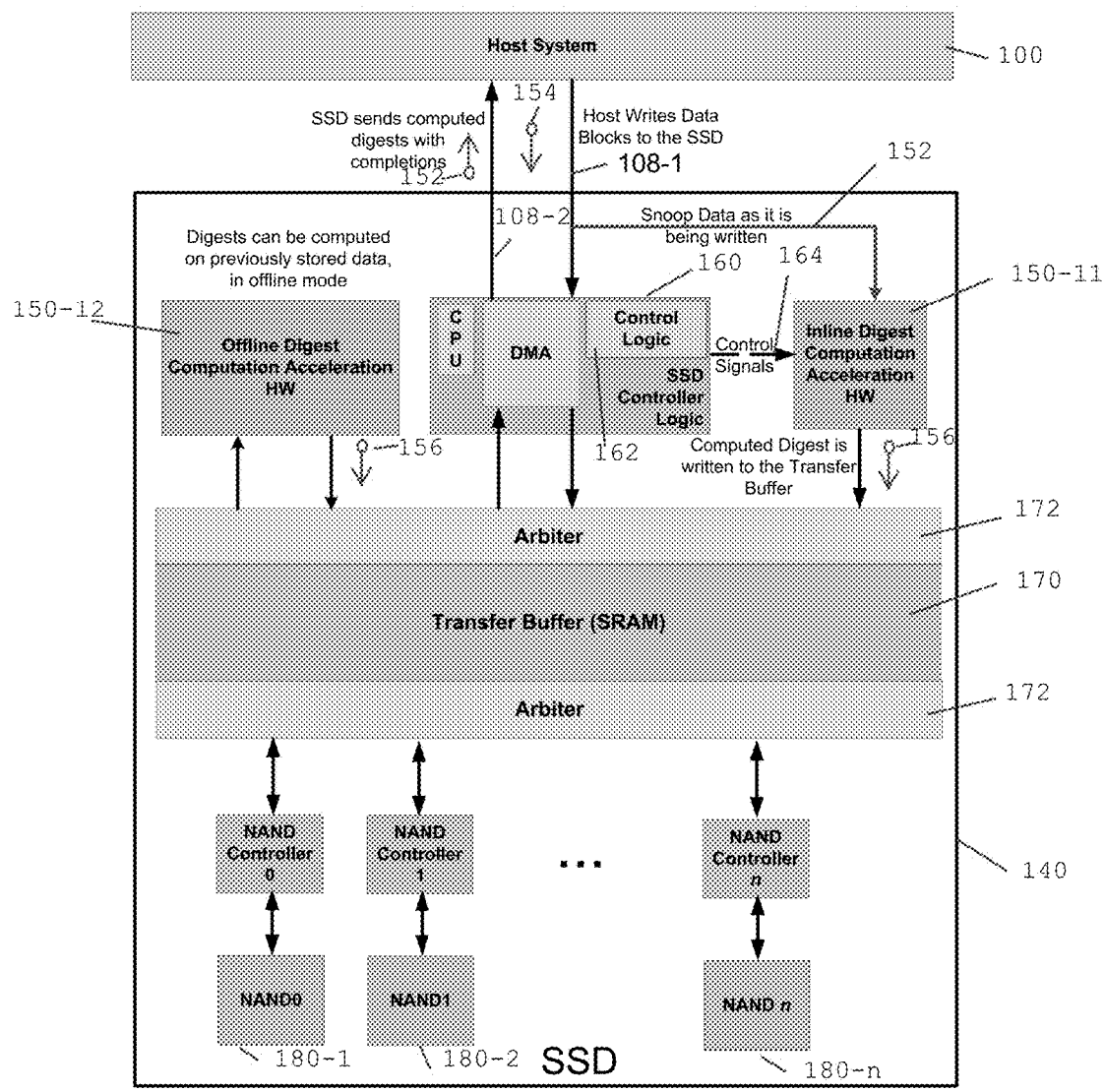
FIG. 3 shows a block diagram of a device for message digest computation as in FIG. 2.

FIG. 3 shows a block diagram of a device for message digest computation as in FIG. 2. Referring to FIGS. 1 and 3, the SSD 140 includes one or more hardware accelerators 150-11, 150-12 (150 generally) native to the SSD and employed for security features in the SSD. However, in addition to these native SSD functions, inline digest computation acceleration hardware 150-11 computes message digests inline by a data sniffer or snoop line 152 that noninvasively reads the write stream 108-1 from the host. The inline, non-intrusive nature avoids a performance impact that would occur with redirecting and/or copying the data to a buffer for separate MD calculations, as shown in FIGS. 1a and 1b above. Offline digest computation acceleration HW 150-12 performs similar digest computation in an offline mode for requests 154 from the host that are voluminous or not urgent. In both cases, MD results 152 are returned to the host 100 responsive to the host request 154, effectively allowing the host 100 to invoke the digest computation capabilities of the SSD 140 without redirecting and/or invoking separate dedicated digest computation hardware 130 since the SSD accelerators 150 have the data stream 108-1 readily available and can perform the digest computation with no or minimal impact to normal SSD throughput.

In the SSD 140, an SSD controller 160 includes SSD control logic 162 responsive to the host requests 154 for sending control signals 164 to the hardware accelerator 150-11. Computed digests 156 are sent to a transfer buffer 170, typically an SRAM that buffers data being stored and retrieved from the SSD 140. An arbiter 172 directs snooped data to a memory medium 180-1 . . . 180-N (180 generally), typically a NAND memory, for storage consistent with an original storage request from the host 100, while the computed digest 152 is sent back to the host 100.

Figure 4:
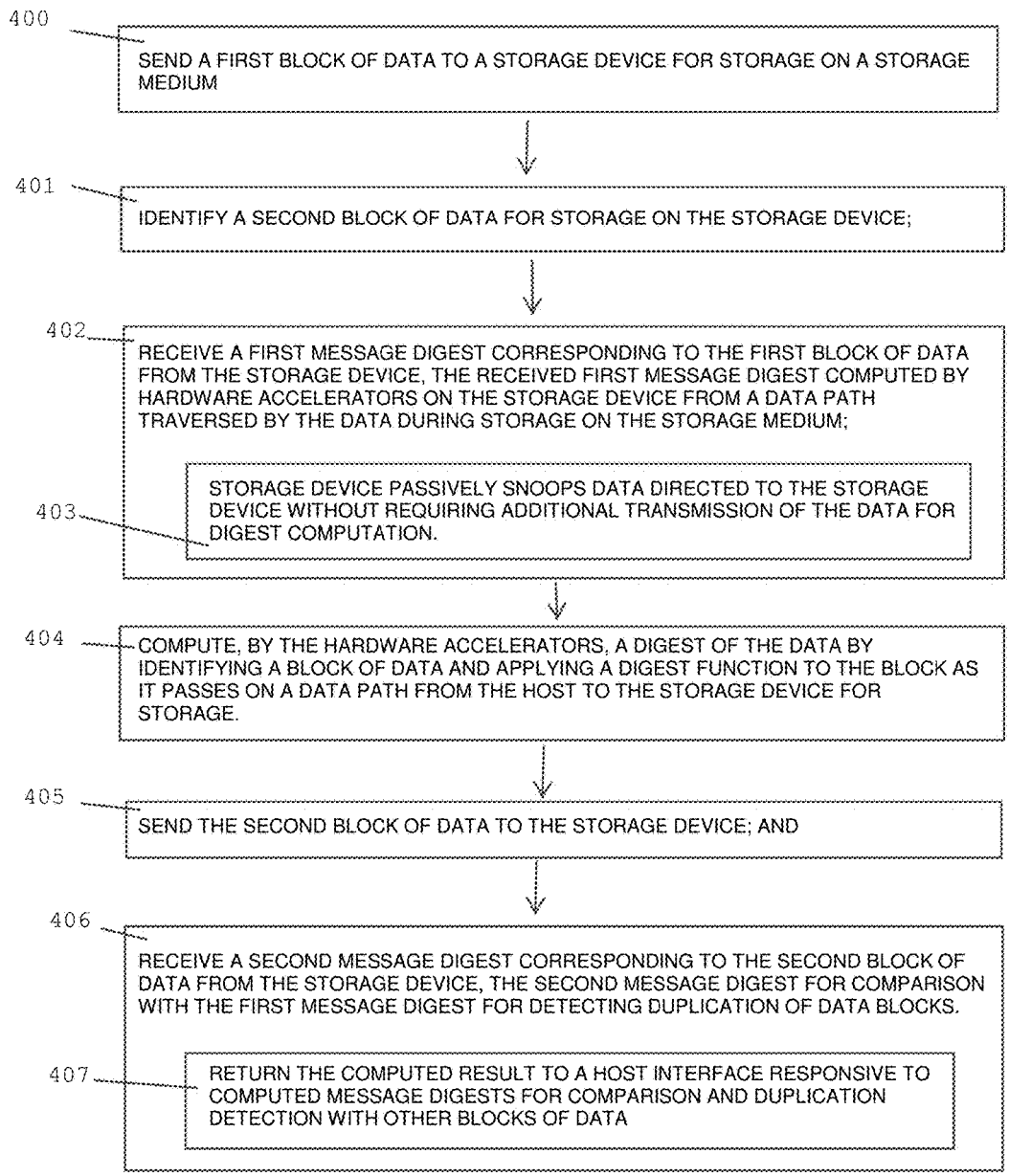
FIG. 4 shows a flowchart of a host side interface for computing a message digest.

FIG. 4 shows a flowchart of a host side interface for computing a message digest. Referring to FIGS. 3 and 4, the host 100 invokes the SSD 140 for performing the digest computation, and receives a result 152 based on a hash (digest) computed as the hashed data passes through the SSD for storage on a storage medium 180 in the SSD 140. The host 100 sends a first block of data to the storage device 140 for storage on the storage medium 180, and identifies a second block of data for storage on the storage device (SSD) 140, as depicted at step 401. In response, the host 100 will receive a first message digest as a response 152 corresponding to the first block of data from the storage device 140, such that the received first message digest is computed by the hardware accelerators 150 on the storage device 140 from a data path 152 traversed by the data during storage on the storage medium 180, as depicted at step 402. The storage device 140 passively snoops data via data path 152, directed to the storage device without requiring additional transmission of the data for digest computation, as shown at step 403.

The hardware accelerators 150 compute a digest of the data by identifying a block of data (or other increment) and applying a digest function to the block as it passes on a data path 108 from the host 100 to the storage device 140 for storage, as shown at step 404. The host 100 sends the second block of data to the storage device 140, as depicted at step 405. The first and second blocks of data need not be consecutive, and may be separated by other storage requests. At a subsequent time, the host 100 receives a second message digest corresponding to the second block of data from the storage device 140, such that the second message digest is for comparison with the first message digest for detecting duplication of data blocks, as depicted at step 406. Detection of duplicate data blocks (de-dupe processing) may occur at any suitable interval, however optimization and tuning parameters will dictate a range of previous blocks likely to contain duplicates, such as per file, per unit time (i.e. a fixed interval, such as N minutes), or other criteria. The storage device 140 returns the computed result 152 to a host 100 interface responsive to computed message digests for comparison and duplication detection with other blocks of data, as disclosed at step 407.

Figure 5:
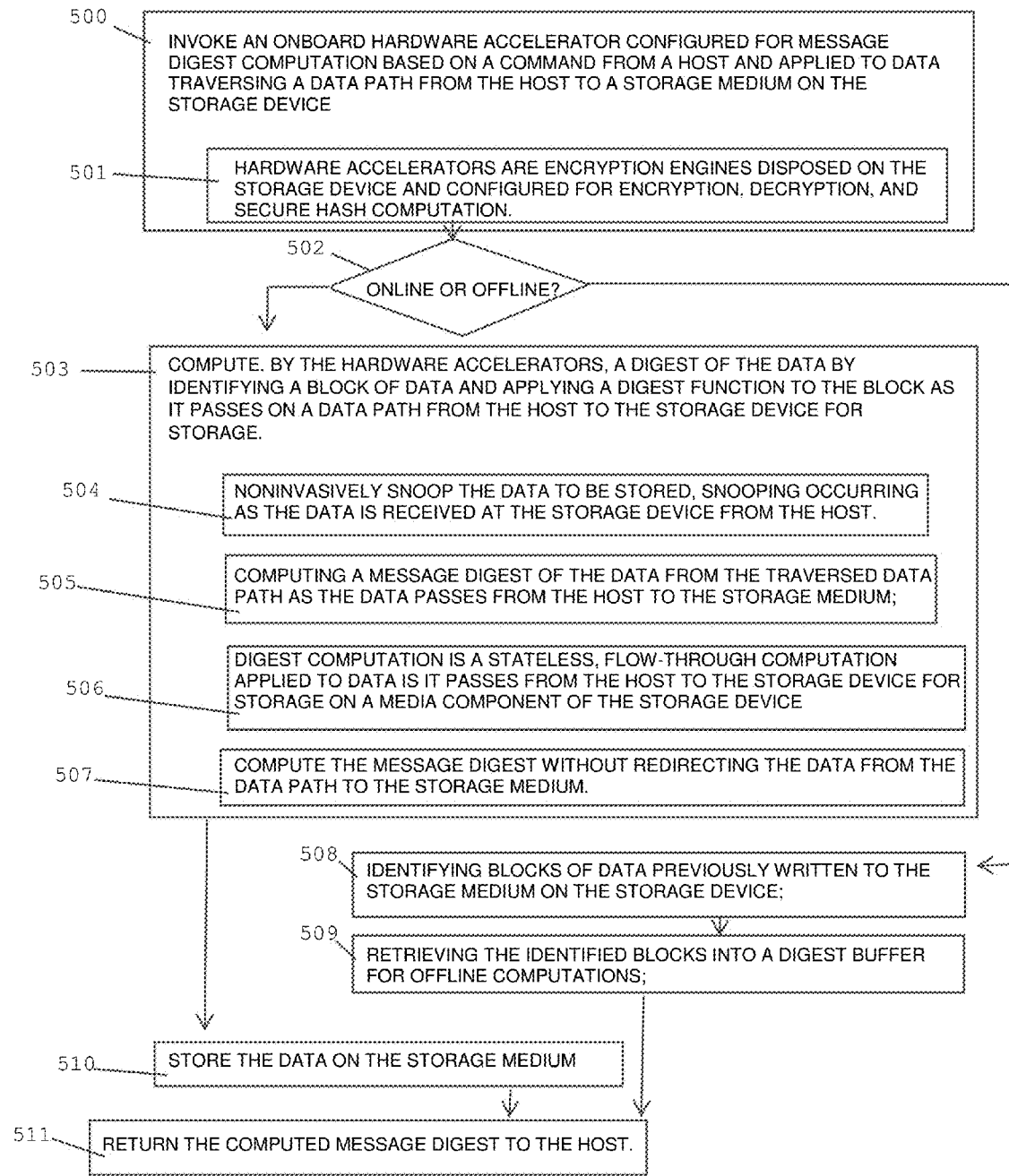
FIG. 5 shows a flowchart of a device side interface for computing a message digest.

FIG. 5 shows a flowchart of a device side interface for computing a message digest. Referring to FIGS. 3 and 5, at step 500, the method of data duplication detection as disclosed herein includes invoking an onboard hardware accelerator 150 configured for message digest computation based on a command or request 154 from a host 100 and applied to data traversing a data path 108-1 from the host 100 to a storage medium 180 on the storage device 140. In the example configuration, the hardware accelerators 150 are encryption engines disposed on the storage device 140 and configured for encryption, decryption, and secure hash computation, as depicted at step 501. A decision is made, at step 502, based on whether the request 154 is for online or offline digest computation. If online digest computation is requested, then the hardware accelerators 140 compute a digest of the data by identifying a block of data and applying a digest function to the block as it passes on a data path 152 from the host 100 to the storage device 140 for storage on the storage medium 180, as depicted at step 503. In the example arrangement, this involves noninvasive snooping of the data to be stored, such that snooping occurs as the data is received at the storage device from the host on data path 108-1, and branched or passively "sniffed" by data line 152 as the data continues unimpeded to storage, as shown at step 504. Therefore, the hardware accelerators 140 compute a message digest of the data from the traversed data path 108-1 as the data passes from the host 100 to the storage medium 180, as depicted at step 505. The digest computation is a stateless, flow-through computation applied to data is it passes from the host 100 to the storage device 140 for storage on a media component, or storage medium 180, of the storage device 140, as disclosed at step 506. This approach avoids latencies associated since the data is fed in parallel to a dedicated HW acceleration engine. This approach is also power efficient since the data is not sent to system DRAM or to a dedicated external acceleration HW engine which are both prone to use more power to complete the same operation. The approach offloads host CPU computation of digests and allows that computation to be distributed across a large number of drives (storage devices 140) in the storage subsystem. The hardware accelerators 150 therefore compute the message digest without redirecting the data from the data path 108-1 to the storage medium 180, but merely snoop or observe the data, as depicted at step 507. The data is then written (concurrently or in any particular order) on the storage medium 180, as depicted at step 510.

If the hardware accelerators 150 are invoked for offline computation, as per the check at step 502, an offline digest computation occurs. In the inline method, the digests are computed as the data is flowing through the SSD for each write operation performed. This is typically the most efficient method of computing the digests. However, the host 100 might request digests for other blocks already present on the SSD for which the request 154 initiates an offline method where the data is read from the medium into a transfer buffer, usually defined by Static Random-Access Memory (SRAM), and the offline engine 150-12 works on this data to compute the digests. After the digests are computed they are sent to the host 100 for digest matching. Offline digest computation therefore includes identifying blocks of data previously written to the storage medium 180 on the storage device 140, as depicted at step 508, and retrieving the identified blocks into a digest buffer for offline computations, as shown at step 509. In either case, the storage device 140 returns the computed message digest to the host 100 as a response 152, as shown at step 511.

Those skilled in the art should readily appreciate that the programs and methods defined herein are deliverable to a user processing and rendering device in many forms, including but not limited to a) information permanently stored on non-writeable storage media such as ROM devices, b) information alterably stored on writeable non-transitory storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method comprising:
   receiving a first write request to store a first block of data at a storage device coupled with a host;
   implementing noninvasive snooping of the first block of data as the first block of data is received at the storage device;
   computing, via use of a hardware accelerator at the storage device, a first message digest of the first block of data responsive to receiving a first command to compute the first message digest in conjunction with fulfilling the first write request, the first message digest computed via a stateless, flow-through computation applied to the first block of data as the first block of data passes on a data path from the host to the storage device;

storing the first block of data in a storage medium at the storage device;

receiving a second write request to store a second block of data at the storage device;

implementing noninvasive snooping of the second block of data as the second block of data is received at the storage device;

computing, via use of the hardware accelerator at the storage device, a second message digest of the second block of data responsive to receiving a second command to compute the second message digest in conjunction with fulfilling the second write request, the second message digest computed via a stateless, flow-through computation applied to the second block of data as the second block of data passes on the data path from the host to the storage device;

storing the second block of data in the storage medium at the storage device; and sending the first and second message digests to the host to enable the host to compare the first message digest with the second message digest for detecting duplication of blocks of data.

2. The method of claim 1, comprising computing the first and second message digests without redirecting respective first and second blocks of data from a data path to the storage medium.

3. The method of claim 1, computing the first and second message digests comprises the hardware accelerator separately applying a digest function to the first and second blocks of data as the first and second blocks of data pass on a data path from the host to the storage device.

4. The method of claim 1, comprising the hardware accelerator to also perform compression and security functions for data passing between the host and the storage device, the security functions including encryption, decryption or secure hash computation.

5. The method of claim 1, further comprising:

identifying a third block of data previously written to the storage medium;

retrieving the third block of data and store to a buffer for offline message digest computation;

compute, via use of the hardware accelerator at the storage device, a third message digest of the third block of data stored to the buffer; and sending the third message digest to the host to enable the host to compare the third message digest with one or more other message digests previously sent from the storage device to detect duplication of blocks of data stored at the storage device.

6. The method of claim 1, the storage device comprising a solid state drive and the storage medium includes NAND memory.

7. A storage device comprising:

an interface coupled with a host device;

a storage medium; and a hardware accelerator to compute message digests for respective blocks of data received from the host device, the hardware accelerator to implement noninvasive snooping of the respective blocks of data to be stored at the storage medium, the noninvasive snooping to occur as the respective blocks of data are received at the storage medium from the host device, the computed message digests are computed by the hardware accelerator via a stateless, flow-through computation applied to the respective blocks of data as the respective blocks of data pass from the host device to the storage medium, the respective blocks of data to traverse a data path from the host device to the storage medium, the hardware accelerator to compute the message digests responsive to separate commands from the host device for respective write requests to store the respective blocks of data in the storage medium, the message digests computed in conjunction with fulfilling respective write requests, computed message digests sent to the host device through the interface, the host device to use the computed message digests to detect duplication of blocks of data stored in the storage medium.

8. The storage device of claim 7, comprising the hardware accelerator to compute message digests without redirection of the respective blocks of data from the data path from the host device to the storage medium.

9. The storage device of claim 7, the hardware accelerator to compute message digests comprises the hardware accelerator to separately apply a digest function to the respective blocks of data as the respective blocks of data pass on the data path from the host device to the storage medium.

10. The storage device of claim 7, comprising the hardware accelerator to also perform compression and security functions for data that passes between the host device and the storage device, the security functions to include encryption, decryption or secure hash computation.

11. The storage device of claim 7, the hardware accelerator further comprising an offline module, the offline module to:

identify one or more blocks of data previously written to the storage medium;

retrieve the one or more blocks of data and store the one or more blocks of data to a buffer for offline message digest computation;

compute one or more respective message digests of the one or more blocks of data stored to the buffer; and cause the one or more respective message digests to be sent to the host device to enable the host device to compare the one or more respective message digests with one or more other message digests previously sent from the storage device to detect duplication of blocks of data stored at the storage device.

12. The storage device of claim 7, the storage device comprises a solid state drive, the storage medium to include NAND memory.

13. A system comprising:

a host device; and a solid state drive that includes:

an interface coupled with the host device;

a storage medium; and a hardware accelerator to:

compute message digests for respective blocks of data received from the host device, the hardware accelerator to implement noninvasive snooping of the respective blocks of data to be stored at the storage medium, the noninvasive snooping to occur as the respective blocks of data are received at the storage medium from the host device, the computed message digests are computed by the hardware accelerator via a stateless, flow-through computation applied to the respective blocks of data as the respective blocks of data pass from the host device to the storage medium, the respective blocks of data to traverse a data path from the host device to the storage medium, the hardware accelerator to compute the message digests responsive to separate commands from the host device for respective write requests to store the respective blocks of data in the storage medium, the message digests computed in conjunction with fulfilling respective write requests; and cause computed message digests to be sent to the host device through the interface, wherein, the host device to use the computed message digests to detect duplication of blocks of data stored in the storage medium.

14. The system of claim 13, comprising the hardware accelerator to compute message digests without redirection of the respective blocks of data from the data path from the host device to the storage medium.

15. The system of claim 13, the hardware accelerator to compute message digests comprises the hardware accelerator to separately apply a digest function to the respective blocks of data as the respective blocks of data pass on the data path from the host device to the storage medium.

16. The system of claim 13, comprising the hardware accelerator to also perform compression and security functions for data that passes between the host device and the solid state drive, the security functions to include encryption, decryption or secure hash computation.

17. The system of claim 13, the hardware accelerator further comprising an offline module, the offline module to:
identify one or more blocks of data previously written to the storage medium;
retrieve the one or more blocks of data and store the one or more blocks of data to a buffer for offline message digest computation;
compute one or more respective message digests of the one or more blocks of data stored to the buffer; and
cause the one or more respective message digests to be sent to the host device to enable the host device to compare the one or more respective message digests with one or more other message digests previously sent from the solid state drive to detect duplication of blocks of data stored at the solid state drive.

18. The system of claim 13, comprising the storage medium to include NAND memory.

\* \* \* \* \*